Feb. 28, 1967  N. A. JUDSEN  3,306,314
FLOAT OPERATED AIR RELIEF VALVE
Filed Jan. 27, 1964
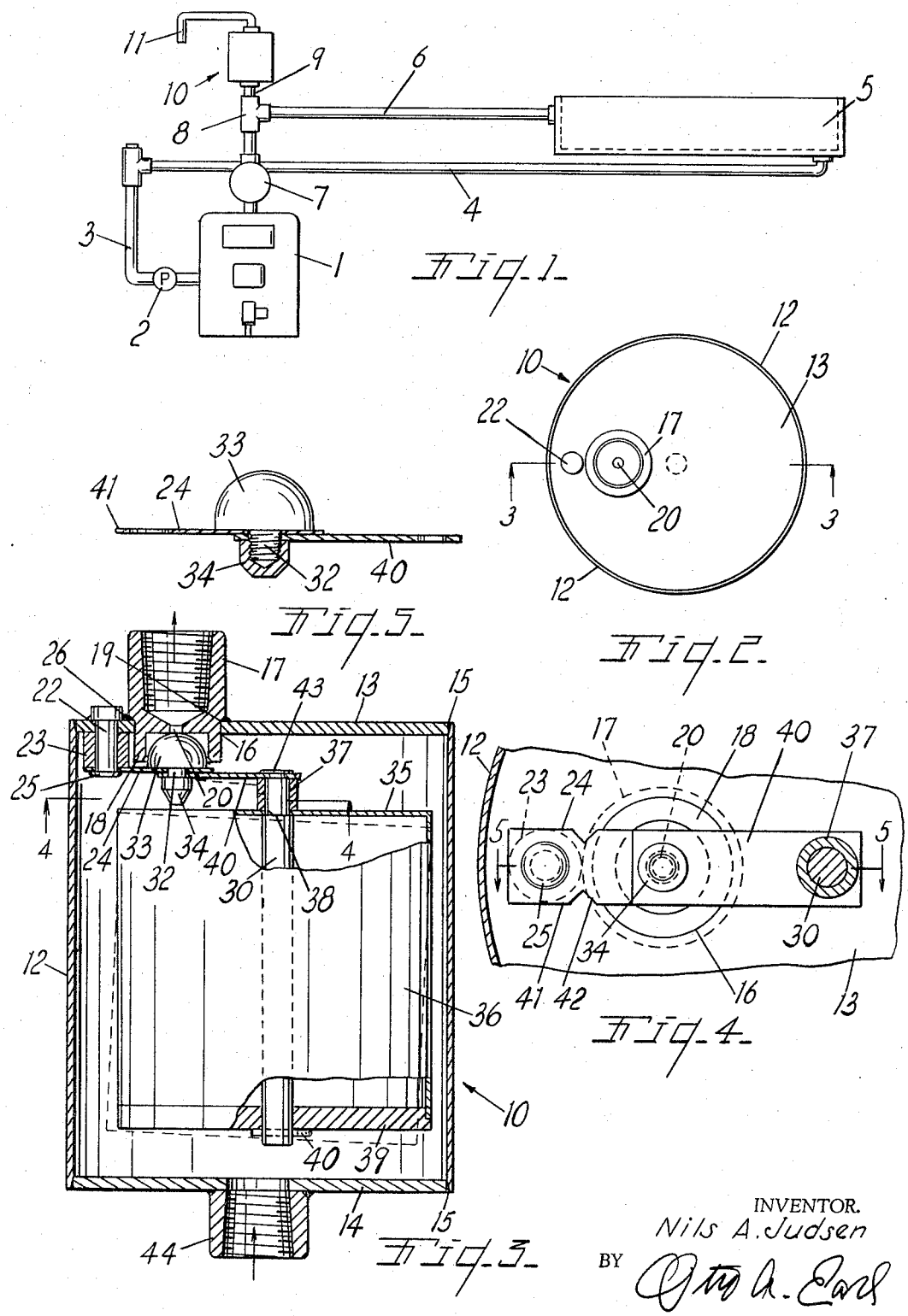
INVENTOR.
Nils A. Judsen
BY
ATTORNEY.

United States Patent Office 3,306,314
Patented Feb. 28, 1967

3,306,314
FLOAT OPERATED AIR RELIEF VALVE
Nils A. Judsen, Three Rivers, Mich., assignor to Armstrong Machine Works, Three Rivers, Mich.
Filed Jan. 27, 1964, Ser. No. 340,420
8 Claims. (Cl. 137—202)

This invention relates to air relief valves. The main objects of this invention are:

First, to provide an air relief valve adapted for eliminating entrapped air from pressurized liquid circulating systems, such for example as in a heating system.

Second, to provide an air relief valve in which the valve elements may be supportedly assembled on an end member of an air trap as an assembled unit and after so assembling the end member may be applied to a container constituting a closure therefor, the container being adapted for connection to a liquid circulating system.

Third, to provide an air relief valve operating on the float principal in which the float is supported within a chamber and acts to open the relief valve upon any accumulation of air in the chamber and to close the valve upon entrance of liquid into the chamber so that the liquid will not escape from the chamber through the valve.

Other objects and advantages of the invention will be apparent from a consideration of the following description and claims.

The drawings, of which there is one sheet, illustrate a highly practical form of the relief valve and one type of liquid circulating system in which the valve is operatively connected.

FIG. 1 is a conventional view illustrating a liquid circulating system with a heater or boiler connected to circulate hot water through a circulating system provided with the air relief valve of the invention to discharge air from the circulating system.

FIG. 2 is a top plan view of the relief valve assembly shown in FIG. 1.

FIG. 3 is an enlarged fragmentary view partially in vertical section on a line corresponding to line 3—3 of FIG. 2.

FIG. 4 is a fragmentary view on a line corresponding to line 4—4 of FIG. 3, illustrating further structural details.

FIG. 5 is an enlarged fragmentary view partially in section on a line corresponding to line 5—5 of FIG. 4.

In FIGURE 1, I illustrate an embodiment of my invention in a heating system, parts being shown mainly in conventional form. The numeral 1 represents a boiler from which water is circulated by a pump 2 through a pipe 3 and delivery pipe 4 to the distributing unit 5 which is conventionally illustrated. The liquid is returned from the unit 5 through the return pipe 6 to receiver 7 which in turn is connected to the boiler. The pipes are connected by a T-coupling 8 from the upper end of which projects a conduit 9. The valve assembly is connected by the coupling 8 and the conduit 9 to the relief valve assembly unit designated generally by the numeral 10. The valve assembly 10 serves to entrap and discharge entrapped air from the liquid circulating system through an exhaust pipe such as indicated at 11 and is designed to prevent the escape of the circulated liquid.

It will be understood that the circulating system including the boiler 1 is an example of one use of the relief valve of this invention and that the valve may be used with other liquid circulating systems which circulate either hot or cold liquids.

The valve assembly of the embodiment of the invention illustrated comprises a cylindrical or generally tubular body member 12 provided with a top member 13 and with a bottom closure member 14, these being desirably of somewhat heavier stock than the body portion 12 and which are sealingly secured to the body member as by brazing or soldering indicated conventionally at 15.

The top member 13 has an off-center hole 16 therein in which the cylindrical valve seat and outlet coupling member 17 is fixedly and sealingly secured. The member 17 has a cylindrical flange-like guide 18 which projects into the housing and is provided with an annular shoulder 19 seated on and sealingly secured to the outside of the end member 13. The coupling member is provided with an outlet port 20. This combined valve seat and coupling member 17 is internally threaded to receive the discharge pipe 11.

In the embodiment illustrated, a rivet 22 projects inwardly from the end member 13 and has a spacer sleeve 23 thereon against which the valve supporting member 24 is clampingly secured, desirably by an upset 25 on the inner end of the rivet. The head of the rivet or coupling member 22 and the outer portion of the valve seat member 17 are fixedly secured and sealed to the head member 13 as by soldering, which is conventionally illustrated at 26.

In the embodiment illustrated the valve support member 24 is formed of two sections, a relatively stiff inner section 40 and an outer springably resilient section 41, the sections being secured together with their ends in overlapping relation; as illustrated in the drawing, the overlapping ends being provided with aligned holes to receive the threaded stem 32 of the valve 33 which is desirably spherically curved as is illustrated. The stem 32 is fittingly engaged in the aligned holes in the overlapping ends, the parts being clampingly secured and the valve clamped thereon by the nut 34 (see FIGS. 3 and 5), the resilient section 41 (which preferably has opposed notches 42 between its connection to the top member and its connection to the valve) thereby facilitating its flexing in a predetermined zone.

In the embodiment illustrated the float support rod 30 extends downwardly through the closed upper end of the cylindrical float 36 which, in the embodiment illustrated, is positioned slightly off center in the body member but it will be understood that although this is not a functionally important detail, it does permit economical forming of the parts and their assembly.

In the embodiment illustrated the float support rod 30 is riveted at 43 to the valve support 24 and serves both to clamp the valve supporting member 24 to the float supporting rod and to clamp the sleeve 37 in sealing engagement with the upper end of the float, the member 30 being provided with a shoulder 38 engaging the inner side of the float top member 35. The float bottom member 39 of relatively rigid stock is shouldered to receive the side of the float and is sealingly secured thereto and has a hole therein through which the stem projects. The float is secured to the stem by means of a cotter or key pin 40. The off center positioning of the float 36 within the body member 12 permits economical forming and assembling of the parts and also the connection of the valve and float coupling unit by means of the rivet 22 to the inner side of the top member 13. The bottom closure member 39 is then easily connected to the bottom of the float and the body member placed around the float and connected to the upper end member 13. The lower end member 14 has a coupling nipple 44 threaded to receive the conduit 9.

In operation of the relief valve in a liquid circulating system such as that conventionally illustrated in FIG. 1, air passing through the pipe 3 rises through the coupling 9 and enters into the cylindrical valve body 12 where it immediately rises to the top of the float chamber and when sufficient liquid is present, the float 36 and the float support rod 30 is supported by buoyancy so that the valve 33 is lifted into seating engagement with the exhaust orifice 20. Air entrapped in the upper end of the body of the valve prevents liquid from ever reaching the valve element 33 and the orifice 20. However, as additional air enters into the body 12, liquid is displaced downwardly in the body until flotation of the float 36 is insufficient to support the float and the valve element 33 so that the valve opens to permit the discharge of air.

The pressure in the system and in the body 12 forces the air out of the exhaust orifice and introduces more liquid into the body which recloses and holds the valve element 33 against the valve seat until air is again accumulated in such amount that the float drops and the valve is opened. The positioning of the valve element 33 within the inwardly projecting cylindrical flange surrounding the valve seat locates the valve relative to the seat and also maintain the proper position of the float 36 within the body 12. The relatively close clearance between the rim of the flange 18 and the valve element prevents inrush of liquid into the body from escaping through the exhaust before the action of the float can close the valve. The valve assembly thus operates to effectively remove accumulated air while retaining the liquid in the circulating system under the pressure of the system. The parts of the valve are simple and inexpensive to manufacture and assemble and the valve assembly is operative on all systems up to the pressure retaining capabilities of the body 12.

We have illustrated and described our invention in a highly practical embodiment thereof. We have not attempted to illustrate or describe other adaptations or embodiments as it is believed that this disclosure will enable those skilled in the art to embody or adapt the invention as may be desired.

Having thus described the invention, what is claimed as new and desired to secure by Letters Patent is:

1. An air relief valve assembly for liquid circulating systems comprising a side wall member and top and bottom walls, the top and bottom walls being of form retaining rigidity, the bottom wall having an inlet coupling member, a combined outlet coupling and valve seat member fixedly mounted on the top wall adjacent but in inwardly spaced relation relative to the side wall and having an outlet port and having an inwardly facing valve seat, and also having an annular flange-like valve guide surrounding said outlet port and projecting inwardly from said top wall, a valve having a spherically curved valve seat-engaging portion coacting with said valve seat and guidingly disposed within said flange and having an inwardly projecting stem, a support member for said valve disposed in inwardly spaced transverse relation to said valve guide and having an opening therein through which said valve stem is disposed, said valve stem being fixedly secured to said valve support member, a support for said valve support member depending from said body member top wall at the side of said valve guide and to which said valve support member is swingably connected, a float disposed within said body member and comprising side, top and bottom walls, the bottom wall being of such thickness as to be nonresilient, and a centrally disposed rod-like coupling member disposed through said top and bottom walls and having a reduced upper end portion provided with a shoulder engaging the inner side of the top wall of said float and connected to the inner end of said valve support member and having a portion projecting above said top wall, a sleeve on said projecting portion, said coupling member being disposed through the inner end of said valve support member and fixedly connected thereto, said sleeve being in supported engagement with the inner side thereof.

2. An air relief valve assembly for liquid circulating systems comprising a side wall member and top and bottom walls, the top and bottom walls being of form retaining rigidity, the bottom wall having an inlet coupling member, a combined outlet coupling and valve seat member fixedly mounted on the top wall and having an outlet port and having an inwardly facing valve seat, and also having an annular flange-like valve guide surrounding said outlet port and projecting inwardly from said top wall, a valve having a spherically curved valve seat-engaging portion coacting with said valve seat and guidingly disposed within said flange, an elongated support member for said valve disposed in inwardly spaced transverse relation to said valve guide, a support for said valve support member depending from said body member top wall at the side of said valve guide and to which said valve support member is swingably connected, a float disposed within said body member and comprising side, top and bottom walls, the bottom wall being of such thickness as to be nonresilient, and a centrally disposed rod-like coupling member disposed through said top and bottom walls and having a reduced upper end portion provided with a shoulder engaging the inner side of the top wall of said float and connected to the inner end of said valve support member and having a portion projecting above said top wall, a sleeve on said projecting portion, said coupling member being disposed through the inner end of said valve support member and fixedly connected thereto, said sleeve being in supported engagement with the inner side thereof.

3. An air relief valve assembly for liquid circulating systems comprising a side wall member and top and bottom walls, the top and bottom walls being of form retaining rigidity, the bottom wall having an inlet coupling member, a combined outlet coupling and valve seat member fixedly mounted on the top wall adjacent but in inwardly spaced relation relative to the side wall and having an outlet port and having an inwardly facing valve seat, and also having an annular flange-like valve guide surrounding said outlet port and projecting inwardly from said top wall, a valve having a spherically curved valve seat-engaging portion coacting with said valve seat and guidingly disposed within said flange and having an inwardly projecting stem, an elongated support member for said valve disposed in inwardly spaced transverse relation to said valve guide and having an opening therein through which said valve stem is disposed, said valve stem being fixedly secured to said valve support member, a support for said valve support member depending from said body member top wall at the side of said valve guide and to which said valve support member is springably connected, a float disposed within said body member and comprising side, top and bottom walls, the bottom wall being of such thickness as to nonresilient, and a rod-like coupling member disposed through said top and bottom walls.

4. An air relief valve assembly for liquid circulating systems comprising a chambered body member provided with an inlet and having a top wall provided with a combined outlet coupling and valve seat member fixedly mounted on the top wall adjacent to but in inwardly spaced relation relative to the side wall of the body member and having an outlet provided with an inwardly facing valve seat and also having an inwardly projecting valve guide member, a spherically curved valve coacting with said valve seat and guidingly disposed within said guide member and having an inwardly projecting stem, a support member for said valve disposed in inwardly spaced transverse relation to said valve guide member and on which said valve is supportedly mounted, a support member for said valve support member depending from said support member top at one side of said valve guide and to which said valve support member is swingably connected, a float disposed within said body member and comprising top and bottom walls and having a centrally disposed rod-like coupling member disposed through its top and bottom wall and with a shoulder engaging the inner side of the top wall, a sleeve disposed on the projecting end of said coupling member on the outer side of the top wall, and said coupling member being disposed through said valve support member in laterally spaced relation to said valve with said sleeve in end thrust engagement with the top of said float and the other side of said valve support member.

5. An air relief valve assembly for liquid circulating systems comprising a chambered body member provided with an inlet and having a top wall provided with a combined outlet coupling and valve seat member fixedly mounted on the top wall and having an outlet provided with an inwardly facing valve seat and also having an inwardly projecting valve guide member, a valve coacting with said valve seat and guidingly disposed within said guide member and having an inwardly projecting stem, a support member for said valve disposed in inwardly spaced transverse relation to said valve guide member and on which said valve is supportedly mounted and swingably connected to said body member, a float disposed within said body member and comprising top and bottom walls and having a centrally disposed rod-like coupling member disposed through its top and bottom wall and with a shoulder engaging the inner side of the top wall, and a sleeve disposed on the projecting end of said coupling member on the outer side of the top wall, said coupling member being disposed through said valve support member in laterally spaced relation to said valve with said sleeve in end thrust engagement with the top of said float and the inner side of said valve support member.

6. An air relief valve assembly for liquid circulating systems comprising a chambered body member provided with an inlet and having a top wall provided with a combined outlet coupling and valve seat member fixedly mounted on the top wall adjacent to but in inwardly spaced relation relative to the side wall of the body member and having an outlet provided with an inwardly facing valve seat and also having an inwardly projecting valve guide member, a valve coating with said valve seat and guidingly disposed within said guide member, a support member for said valve swingably connected at one end to said body member, a float disposed within said body member including top and bottom walls and having a centrally disposed rod-like coupling member disposed through said top and bottom walls and provided with retaining means at the under side of the bottom wall and with a shoulder engaging the inner side of the top wall, and a sleeve disposed on the projecting end of said coupling member at the outer side of the top wall in supported engagement therewith, the upper end of said coupling member being disposed through said valve support member in laterally spaced relation to said valve with said sleeve in end thrust engagement with the top of said float and with the inner side of said valve support member.

7. An air relief valve assembly for liquid circulating systems comprising a chambered body member provided with an inlet and having a top wall provided with a combined outlet coupling and valve seat member fixedly mounted on the top wall adjacent to but in inwardly spaced relation relative to the side wall of the body member and having an outlet provided with an inwardly facing valve seat and also having an inwardly projecting valve guide member, a valve coacting with said valve seat and guidingly disposed within said guide member, an elongated support member for said valve of springably resilient material fixedly mounted at one end on said body member in transverse relation to said valve guide member and on which said valve is fixedly mounted, and a float disposed within said body member and fixedly connected to the other end of said valve support member.

8. An air relief valve assembly for liquid circulating systems comprising a chambered body member provided with an inlet and having a top wall provided with an outlet having an inwardly facing valve seat, a valve coacting with said valve seat, a support member for said valve of springably resilient material fixedly mounted at one end on said body member and disposed in transverse relation to said valve seat, and a float disposed within said body member and fixedly connected to said valve support member.

References Cited by the Examiner

UNITED STATES PATENTS

| | | | |
|---|---|---|---|
| 1,457,055 | 5/1923 | Brewington | 73—322.5 |
| 1,711,272 | 5/1929 | Lueders | 137—434 |
| 1,725,875 | 8/1929 | Luhr | 73—322.5 X |
| 2,276,136 | 3/1942 | Woolley | 137—434 X |
| 2,586,143 | 2/1952 | Baker | 137—185 |
| 3,152,608 | 10/1964 | Morrison | 137—527 X |

FOREIGN PATENTS 775,296   10/1934   France.

ALAN COHAN, *Primary Examiner.*